US011628726B1

(12) United States Patent
Kim et al.

(10) Patent No.: US 11,628,726 B1
(45) Date of Patent: Apr. 18, 2023

(54) INDOOR DISPLAY APPARATUS OF VEHICLE AND CONTROL METHOD THEREOF

(71) Applicant: HYUNDAI MOBIS CO., LTD., Seoul (KR)

(72) Inventors: Do Hyung Kim, Yongin-si (KR); Tae Kyoung Jin, Yongin-si (KR); Moo Kwan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/502,676

(22) Filed: Oct. 15, 2021

(51) Int. Cl.
| *B60K 35/00* | (2006.01) |
| *G09F 9/37* | (2006.01) |
| *B60Q 1/50* | (2006.01) |
| *G09G 3/34* | (2006.01) |

(52) U.S. Cl.
CPC .......... *B60K 35/00* (2013.01); *G09G 3/3406* (2013.01); *G09G 3/3486* (2013.01); *B60K 2370/1529* (2019.05); *B60K 2370/165* (2019.05); *B60K 2370/175* (2019.05); *B60K 2370/178* (2019.05); *B60K 2370/179* (2019.05); *B60K 2370/33* (2019.05); *G09G 2360/144* (2013.01); *G09G 2380/10* (2013.01)

(58) Field of Classification Search
CPC ...................................................... B60R 11/04
See application file for complete search history.

(56) References Cited

U.S. PATENT DOCUMENTS

| 6,220,723 B1* | 4/2001 | Freeman | G09F 9/375 |
| | | | 362/240 |
| 2010/0295670 A1* | 11/2010 | Sato | B62D 15/029 |
| | | | 340/458 |
| 2011/0225859 A1* | 9/2011 | Safavi | G09G 3/3611 |
| | | | 40/448 |
| 2013/0307756 A1* | 11/2013 | Sweeney | G02B 30/40 |
| | | | 345/31 |
| 2016/0288709 A1* | 10/2016 | Nespolo | B60K 37/06 |
| 2019/0217773 A1* | 7/2019 | Sasaki | B60W 50/14 |

FOREIGN PATENT DOCUMENTS

KR 10-1487904 B1 2/2015

* cited by examiner

*Primary Examiner* — Nan-Ying Yang
(74) *Attorney, Agent, or Firm* — NSIP Law

(57) ABSTRACT

An indoor display apparatus of a vehicle may include a vehicle state inputter configured to receive a vehicle state, a front detector configured to detect an object ahead of a vehicle, a flip-dot display installed at a top of a cockpit module, and being configured to implement a pixel by rotating a flip disk, an illuminator installed around the flip-dot display, and being configured to illuminate the surface of the flip-dot display, and a controller configured to receive an operation mode of the vehicle from the vehicle state inputter, to receive a distance to the object and a direction of the object from the front detector, and to operate the flip-dot display and the illuminator.

18 Claims, 8 Drawing Sheets

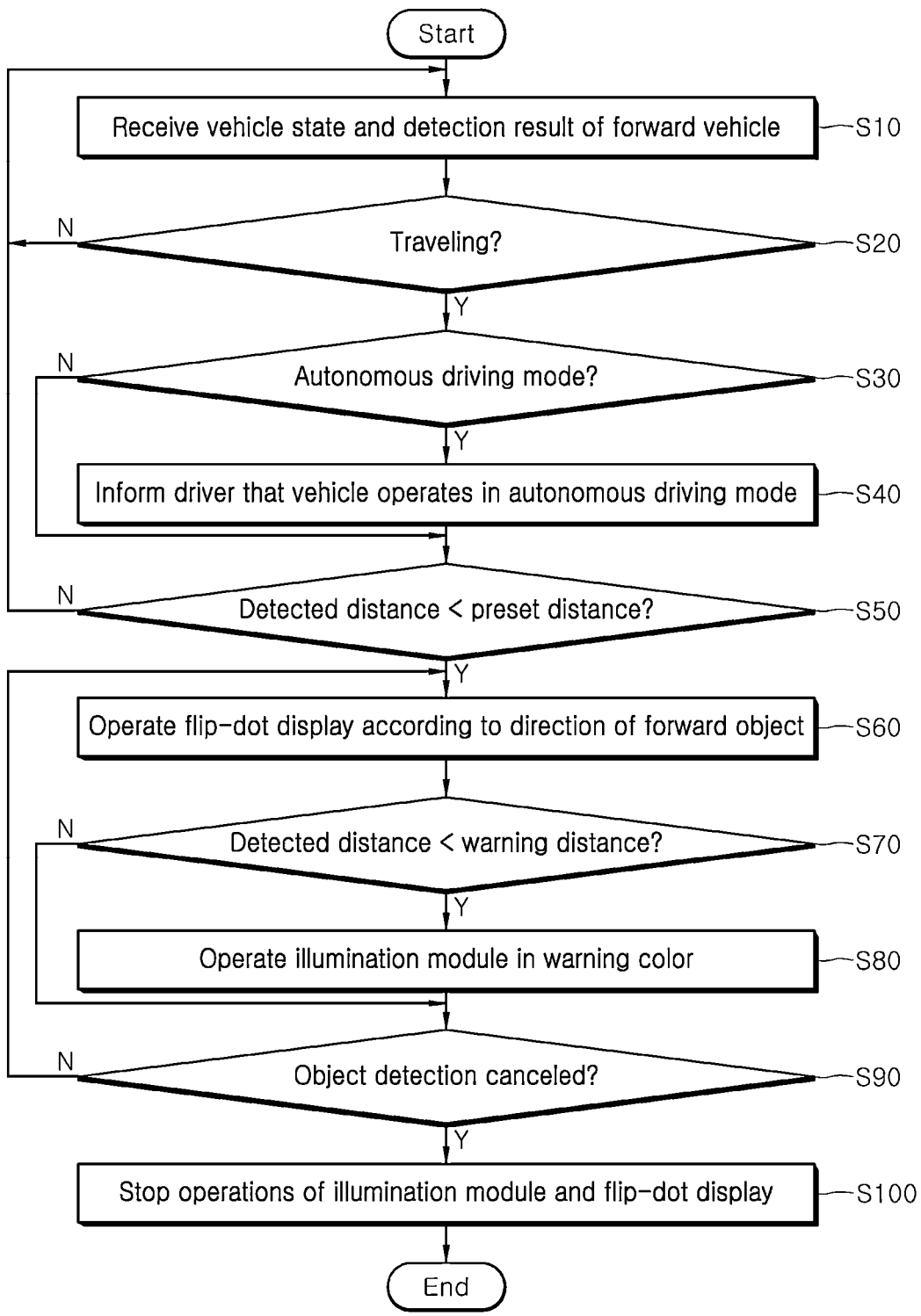

INDOOR DISPLAY APPARATUS OF VEHICLE AND CONTROL METHOD THEREOF

BACKGROUND

Field

Exemplary embodiments of the present disclosure relate to an indoor display apparatus of a vehicle and a control method thereof, and more particularly, to an indoor display apparatus of a vehicle, which includes a flip-dot display installed at the top of a cockpit module inside a vehicle and configured to output external environment information during autonomous driving such that the external environment information can be intuitionally transferred to a driver, and a control method thereof.

Discussion of Related Art

In general, an image display apparatus refers to an apparatus that outputs information as an image using a screen. The image display apparatus may include a general monitor as one of computer output apparatuses. Output data are mostly expressed as characters, symbols, figures, images, voice and the like. All data except the voice, among the above-described data, are recognized with the eyes. The image display apparatus temporarily displays such information through the screen.

Examples of such an image display apparatus include a CRT (Cathode Ray Tube), LCD (Liquid Crystal Display), TFT-LCD (Thin Film Transistor-LCD), PDP (Plasma Display), flexible display, HMD (Head Mounted Display) and the like.

Recently, a flip-dot display has been developed, which rotates a flip disk having surfaces with different colors by changing the polarity of an electromagnet, thereby implementing a pixel.

The related art of the present disclosure is disclosed in Korean Patent No. 10-1487904 published on Feb. 4, 2015 and entitled "Flip Dot Display Element using Electromagnet and Assembly Module Thereof".

An autopilot system is embedded in various driving units for a driver, and performs autonomous driving through driving location search. The auto-cruise system is mainly applied to a ship, airplane and the like. Recently, the autopilot system is also applied to a vehicle that travels on the road, and informs a user of various pieces of information such as a traveling route and road congestion through a monitor, or autonomously drives the vehicle or controls the traveling state of the vehicle.

As such, an autonomous vehicle having the autopilot system mounted therein provides external environment information to a driver during autonomous driving, such that the driver can recognize surrounding circumstances during activities other than driving.

However, when the environment information is provided through an indoor ambient light, the visibility may be degraded in the daytime. When the environment information is transferred through speaker sound, the intuition may be degraded because the recognition of space perception such as directivity is insufficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an indoor display apparatus of a vehicle, including a vehicle state inputter configured to receive a vehicle state, a front detector configured to detect an object ahead of a vehicle, a flip-dot display installed at a top of a cockpit module, and being configured to implement a pixel by rotating a flip disk, an illuminator installed around the flip-dot display, and being configured to illuminate the surface of the flip-dot display, and a controller configured to receive an operation mode of the vehicle from the vehicle state inputter, to receive a distance to the object and a direction of the object from the front detector, and to operate the flip-dot display and the illuminator.

The flip-dot display further may include a clear cover configured to prevent foreign matters from entering the flip-dot display.

A front surface and a rear surface of the flip disk may have different colors.

A front surface and a rear surface of the flip disk may have different reflection characteristics.

In response to the operation mode of the vehicle being an autonomous driving mode, the controller may be configured to operate the illuminator in a color according to the autonomous driving mode, and to operate the flip-dot display to reflect light of the illuminator.

In response to the object being detected and the distance to the object being within a threshold, the controller may be configured to operate the flip-dot display according to the detection direction and motion of the object.

In response to the distance to the object being within a warning distance, the controller may be configured to operate the flip-dot display while operating the illuminator in a warning color.

The indoor display apparatus may include an illuminance sensor configured to detect ambient brightness of the vehicle, wherein in response to the object being detected and the distance to the object being within a threshold, the controller may be configured to operate the illuminator according to the ambient brightness, and to operate the flip-dot display to reflect the light of the illuminator according to the detected direction and motion of the object.

The controller may be configured to receive the vehicle state, and to operate the flip-dot display to output welcome animation, in response to the vehicle states indicating that the vehicle has started.

In another general aspect, there is provided a control method of an indoor display apparatus of a vehicle, comprising receiving, by a controller, a vehicle state and a result of detecting an object, determining, by the controller, whether the object is detected while the vehicle travels, according to the vehicle state and the result of the detection of the object, and operating, by the controller, a flip-dot display and an illuminator according to a distance to the object and a direction of the object, in response to the object being detected while the vehicle travels.

The flip-dot display may include a flip disk having a front surface and a rear surface, which have different colors.

The flip-dot display may include a flip disk having a front surface and a rear surface, which have different reflection characteristics.

The operating of the flip-dot display and the illuminator may include operating, by the controller, the flip-dot display according to the detected direction and motion of the object, in response to the distance to the object being within a threshold.

The operating of the flip-dot display and the illuminator may include operating, by the controller, the flip-dot display while operating the illuminator in a warning color, in response to the distance to the object being within a warning distance.

The operating of the flip-dot display and the illuminator may include receiving, by the controller, ambient brightness from an illuminance sensor, operating the illuminator according to the ambient brightness in response to the distance to the object being within a threshold, and operating the flip-dot display to reflect the light of the illuminator according to the detected direction and motion of the object.

The control method may include operating, by the controller, the illuminator in a color according to the autonomous driving mode, and operating the flip-dot display to reflect light of the illuminator, in response to the vehicle state indicating that the operation mode of the vehicle is an autonomous driving mode.

The control method may include operating, by the controller, the flip-dot display to output welcome animation, in response to the vehicle state indicating that the vehicle has started.

Other features and aspects will be apparent from the following detailed description, the drawings, and the claims.

BRIEF DESCRIPTION OF THE DRAWINGS

FIG. 6 is a flowchart for describing a control method of an indoor display apparatus of a vehicle in accordance with an embodiment of the present disclosure.

Figure 1:
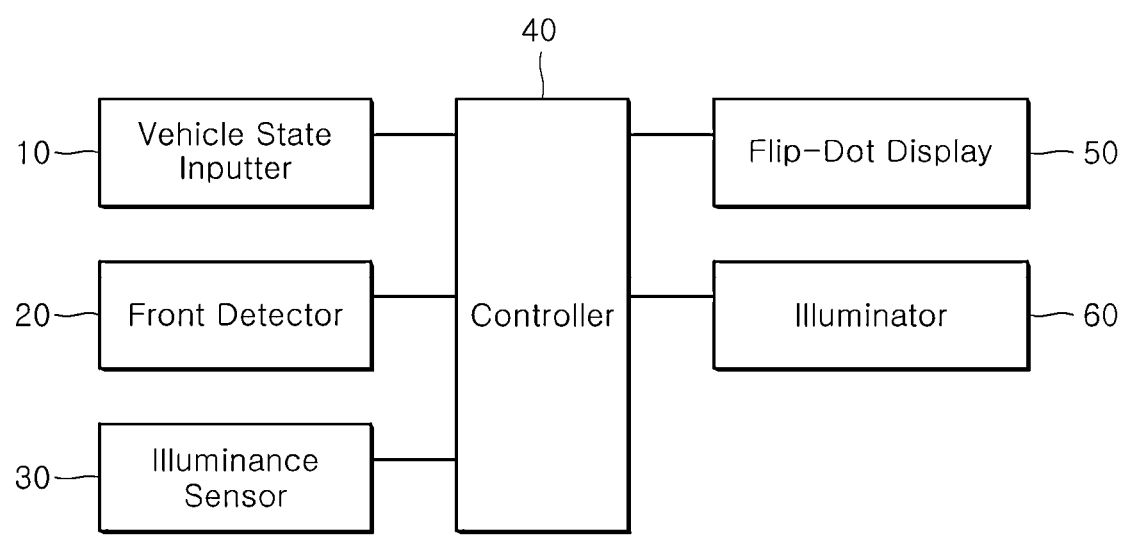
FIG. 1 is a block configuration diagram illustrating an indoor display apparatus of a vehicle in accordance with an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 2:
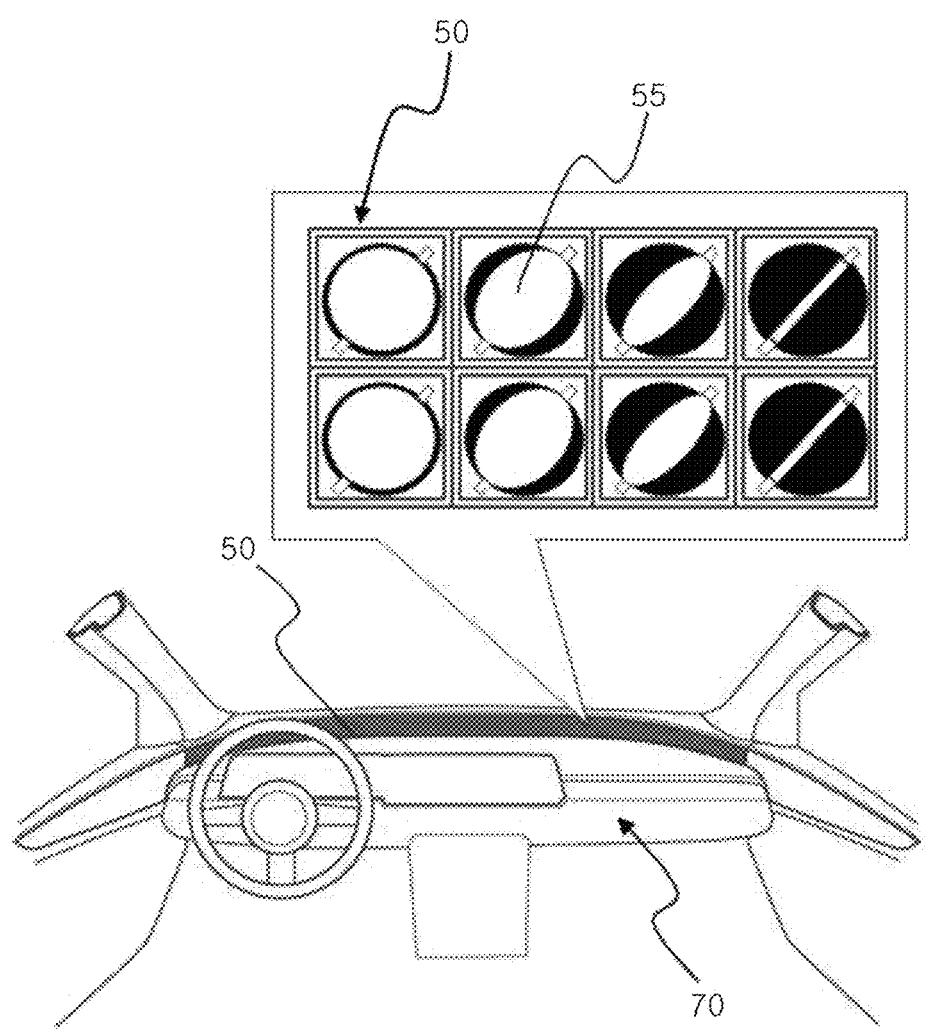
FIG. 2 is a diagram illustrating that the indoor display apparatus of the vehicle in accordance with the embodiment of the present disclosure is mounted.
Figure 3:
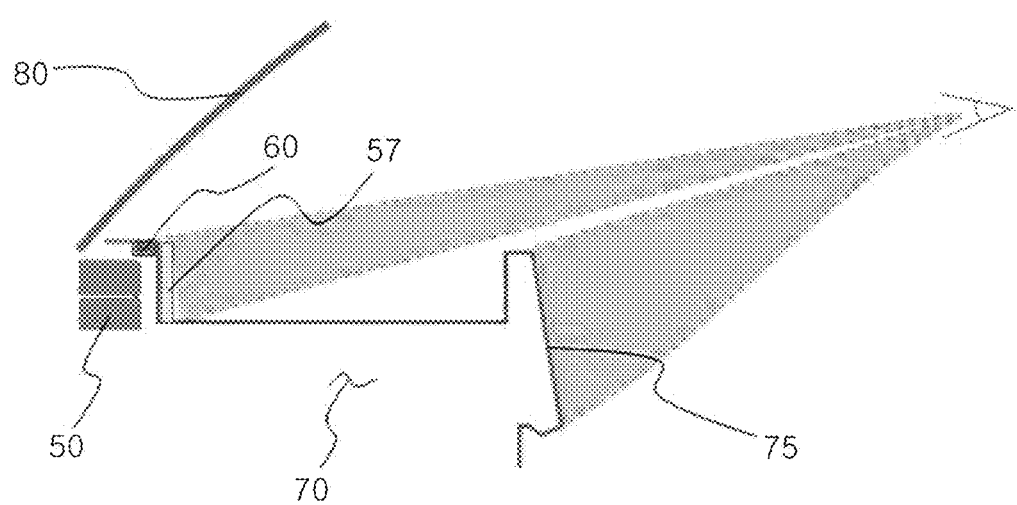
FIG. 3 is a side cross-sectional view illustrating that the indoor display apparatus of the vehicle in accordance with the embodiment of the present disclosure is mounted.
Figure 4:
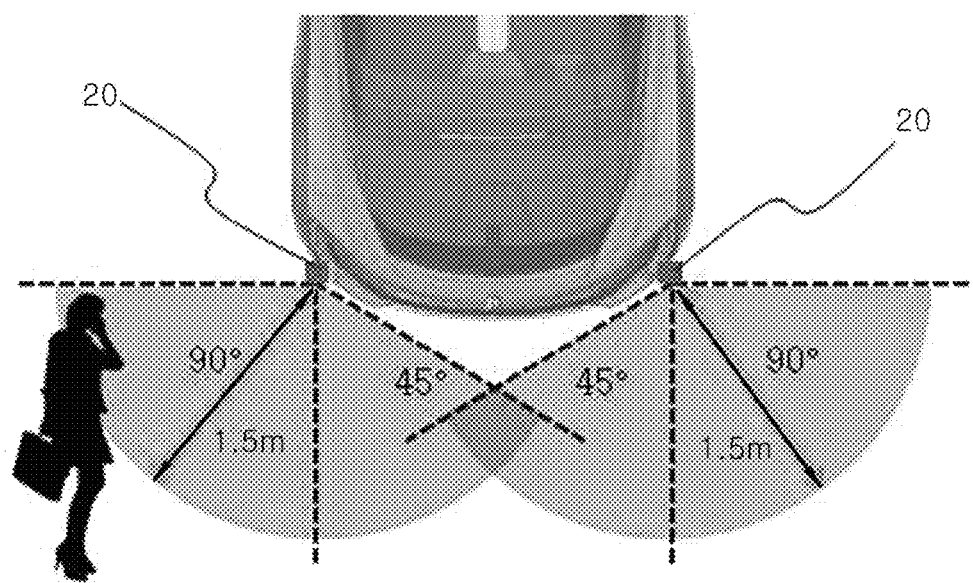
FIG. 4 is a diagram for describing a detection region of a front detection unit in the indoor display apparatus of the vehicle in accordance with the embodiment of the present disclosure.

FIG. 1 is a block configuration diagram illustrating an indoor display apparatus of a vehicle in accordance with an embodiment of the present disclosure, FIG. 2 is a diagram illustrating that the indoor display apparatus of the vehicle in accordance with the embodiment of the present disclosure is mounted, FIG. 3 is a side cross-sectional view illustrating that the indoor display apparatus of the vehicle in accordance with the embodiment of the present disclosure is mounted, FIG. 4 is a diagram for describing a detection region of a front detector in the indoor display apparatus of the vehicle in accordance with the embodiment of the present disclosure, and FIG. 5 is a diagram illustrating an operation state of the indoor display apparatus of the vehicle in accordance with the embodiment of the present disclosure.

As illustrated in FIGS. 1 to 3, the indoor display apparatus of the vehicle in accordance with the embodiment of the present disclosure may include a vehicle state inputter 10, a front detector 20, a flip-dot display 50, an illuminator 60, a controller 40 and an illuminance sensor 30.

The vehicle state inputter 10 may receive the operation state and traveling state of the vehicle, and provide the received information to the controller 40, such that the controller 40 can determine whether the vehicle is traveling in an autonomous driving mode and display the determination result.

As illustrated in FIG. 4, the front detector 20 may be installed at the front of the vehicle, detect a forward object ahead of the vehicle, and provide the detected distance and direction to the controller 40, such that the controller 40 can operate the flip-dot display 50 according to the detected distance to the forward object and the detected direction of the forward object.

As illustrated in FIG. 2, the flip-dot display 50 may be installed at the top of a cockpit module 70, and implement a pixel through a process of rotating a flip disk 55 whose front and rear surfaces have different colors, by changing the polarity of an electromagnet. With this structure, the volume and weight of the flip-dot display 50 may be reduced more than a structure that rotates flip disks using an actuator, which makes it possible to reduce the manufacturing cost thereof.

The cockpit module 70 is disposed in front of a driver seat and passenger seat in the vehicle, and serves to divide an engine room from the inside of the vehicle. The cockpit module 70 may include a steering wheel and an instrument panel, which are installed at the driver seat for a steering function of the vehicle, a glove box and a passenger seat airbag device, which are installed at the passenger seat, and a display device, an audio device and an air conditioner which are installed at the center fascia.

As illustrated in FIG. 3, the flip-dot display 50 may be installed at the top of the cockpit module 70 inside a windshield 80 such that a main display 75 installed at the front surface of the cockpit module 70 and a viewing angle of a driver are distinguished from each other, and include a clear cover 57 for preventing foreign matters.

The illuminator 60 may be installed around the flip-dot display 50, and illuminate the surface of the flip-dot display 50 so as to obtain an ambient light effect. Furthermore, the illuminator 60 may reflect and display the light of the illuminator 60 while the pixels of the flip-dot display 50 are rotated, thereby improving the visibility in the nighttime.

Here, the front and rear surfaces of the flip disk 55 of the flip-dot display 50 may be set to have different reflecting characteristics (e.g. gloss and matt), which makes it possible to improve the light reflecting effect of the illuminator 60.

The controller 40 may receive the operation mode of the vehicle from the vehicle state inputter 10, receive the distance to the forward object and the direction of the forward object from the front detector 20, and operate the flip-dot display 50 and the illuminator 60.

Figure 5A:
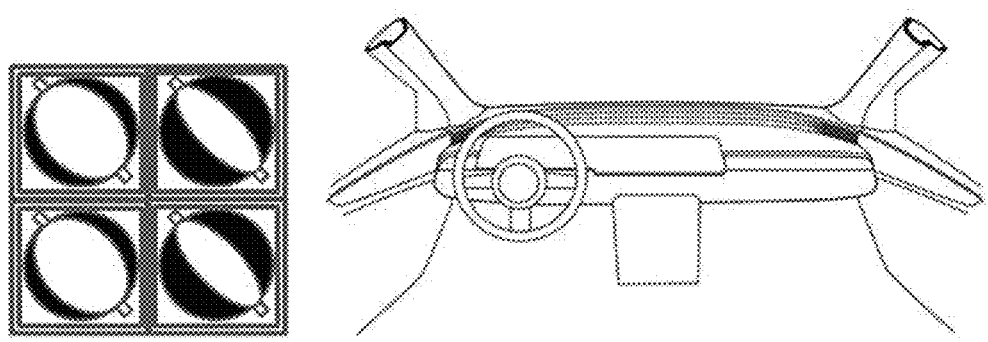
FIGS. 5A to 5C are diagrams illustrating an operation state of the indoor display apparatus of the vehicle in accordance with the embodiment of the present disclosure.
Figure 5B:
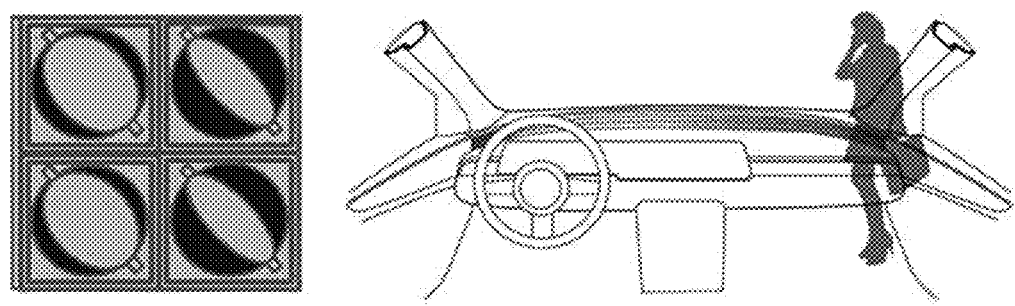
Figure 5C:
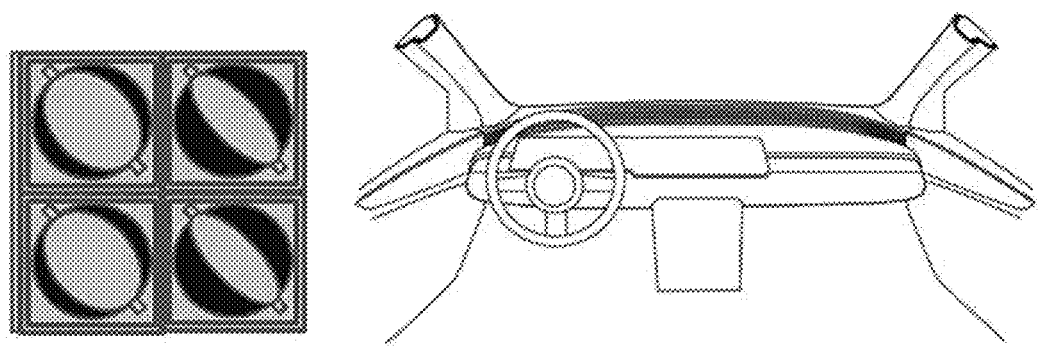

Furthermore, when the operation mode of the vehicle is an autonomous driving mode, the controller 40 may operate the illuminator 60 in color according to the autonomous driving mode as illustrated in FIG. 5C, and operate the flip-dot display 50 to reflect the light of the illuminator 60, thereby informing the driver that the vehicle is traveling in the autonomous driving mode.

Furthermore, when the distance at which the forward object is detected falls within a preset distance, the controller 40 may operate the flip-dot display 50 as illustrated in FIG. 5A, according to the detected direction and movement of the forward object.

For example, when a pedestrian passes the front of the vehicle, the controller 40 may operate the flip-dot display 50 according to the direction in which the pedestrian passes, such that the driver can intuitively recognize the approach of the pedestrian through a surrounding effect using operation noise, caused by sound which is generated while the flip disk 55 is rotated, and visual information displayed on the flip-dot display 50.

When the detected distance at which the forward object is detected falls within a warning distance, the controller 40 may operate the flip-dot display 50 while operating the illuminator 60 in a warning color as illustrated in FIG. 5B.

The illuminance sensor 30 may sense the ambient brightness of the vehicle and provide the ambient brightness to the controller 40. Thus, when the detected distance at which the forward object is detected falls within the preset distance in the case that the forward object is detected, the controller 40 may operate the illuminator 60 in the nighttime or a dark place according to the ambient brightness, and then operate the flip-dot display 50 to reflect the light of the illuminator 60 according to the detection direction and motion of the forward object, thereby improving the visibility in the nighttime.

As described above, the indoor display apparatus of the vehicle in accordance with the embodiment of the present disclosure may include the flip-dot display installed at the top of the cockpit module inside the vehicle, and output external environment information during autonomous driving, thereby obtaining the surrounding effect through the operation noise of the flip-dot display and the visual information. Therefore, the indoor display apparatus can not only intuitionally transfer the external information to the driver, but also improve the visibility in the daytime through the flip-dot display, thereby improving the visual information transfer effect.

FIG. 6 is a flowchart for describing a control method of an indoor display apparatus of a vehicle in accordance with an embodiment of the present disclosure.

As illustrated in FIG. 6, the control method of the indoor display apparatus of the vehicle in accordance with the embodiment of the present disclosure starts with step S10 in which the controller 40 receives a vehicle state from the vehicle state inputter 10, and receives a detection result of a forward object from the front detector 20.

After receiving the vehicle state in step S10, the controller 40 determines whether the vehicle is traveling, in step S20.

When the vehicle state received in step S10 indicates that the vehicle is initially started, the controller 40 may operate the flip-dot display 50 to output welcome animation.

When the determination result of step S20 indicates that the vehicle is not traveling, the controller 40 returns to step S10 to receive the vehicle state and the detection result of the forward object.

On the other hand, when the determination result of step S20 indicates that the vehicle is traveling, the controller 40 determines whether the operation mode of the vehicle is an autonomous driving mode, based on the vehicle state, in step S30.

When the determination result of step S30 indicates that the operation mode of the vehicle is the autonomous driving mode, the controller 40 may operate the illuminator 60 in a color according to the autonomous driving mode as illustrated in FIG. 5C, and operate the flip-dot display 50 to reflect the light of the illuminator 60, thereby informing the driver that the vehicle operates in the autonomous driving mode, in step S40.

When the determination result of step S30 indicates that the operation mode of the vehicle is not the autonomous driving mode, or after the controller 40 informs the driver that the vehicle operates in the autonomous driving mode in step S40, the controller 40 determines whether the detected distance is less than a preset distance, according to the detection result of the forward object, in step S50.

When the determination result of step S50 indicates that no forward object is detected or the detected distance is not less than the preset distance, the controller 40 may return to step S10 to continuously receive the vehicle state and the detection result of the forward object.

However, when the detected distance is less than the preset distance, the controller 40 operates the flip-dot display 50 according to the detected direction and motion of the forward object, in step S60.

As illustrated in FIG. 2, the flip-dot display 50 may be installed at the top of the cockpit module 70, and implement a pixel through a process of rotating the flip disk 55 whose front and rear surfaces have different colors, by changing the polarity of the electromagnet. With this structure, the volume and weight of the flip-dot display 50 may be reduced more than a structure that rotates the flip disks using an actuator, which makes it possible to reduce the manufacturing cost thereof.

Furthermore, the front and rear surfaces of the flip disk 55 of the flip-dot display 50 may be set to have different reflecting characteristics (e.g. gloss and matt), which makes it possible to improve the light reflecting effect of the illuminator 60.

For example, when a pedestrian passes the front of the vehicle, the controller 40 may operate the flip-dot display 50 according to the direction in which the pedestrian passes, such that the driver can intuitionally recognize the approach of the pedestrian through a surrounding effect using operation noise, caused by sound which is generated while the flip disk 55 is rotated, and visual information displayed on the flip-dot display 50.

While operating the flip-dot display 50 according to the detected direction and motion of the forward object in step S60, the controller 40 determines whether the detected distance to the forward object is less than a warning distance, in step S70.

When the determination result of step S70 indicates that the detected distance is less than the warning distance, the controller 40 operates the flip-dot display 50 while operating the illuminator 60 in a warning color as illustrated in FIG. 5B, in step S80.

On the other hand, when the determination result of step S70 indicates that the detected distance is equal to or more than the warning distance or after the controller 40 operates the illuminator 60 in the warning color in step S80, the controller 40 determines whether the object detection has been canceled, in step S90.

The controller determines whether the object detection has been canceled because the detected distance increased or no object was detected according to the detection result, in step S90. When the determination result of step S90 indicates that the object detection is not canceled, the controller 40 returns to step S60 to continuously operate the flip-dot display 50 according to the direction and motion of the forward object.

On the other hand, when the determination result of step S90 indicates that the object detection has been canceled, the controller 40 stops the operations of the flip-dot display 50 and the illuminator 60, in step S100.

The controller 40 may receive the ambient brightness from the illuminance sensor 30. When the detected distance at which the forward object is detected falls within the preset distance, the controller 40 may operate the illuminator 60 in the nighttime or a dark place according to the ambient brightness, and then operate the flip-dot display 50 to reflect the light of the illuminator 60 according to the detected direction and motion of the forward object, thereby improving the visibility in the nighttime.

As described above, the control method of the indoor display apparatus of the vehicle may include the flip-dot display installed at the top of the cockpit module inside the vehicle, and output external environment information during autonomous driving, thereby providing the surrounding effect through the operation noise of the flip-dot display and the visual information. Therefore, the control method can not only intuitionally transfer the external information to the driver, but also improve the visibility in the daytime by the flip-dot display, thereby improving the visual information transfer effect.

The examples described above provide an indoor display apparatus of a vehicle, which includes a flip-dot display installed at the top of a cockpit module inside a vehicle and configured to output external environment information during autonomous driving such that the external environment information can be intuitionally transferred to a driver, and a control method thereof.

The examples described above provide an indoor display apparatus of the vehicle and the control method thereof including the flip-dot display installed at the top of the cockpit module inside the vehicle, and output external environment information during autonomous driving, thereby providing the surrounding effect through the operation noise of the flip-dot display and the visual information. Therefore, the indoor display apparatus of the vehicle and the control method thereof can not only intuitionally transfer the external information to the driver, but also improve the visibility in the daytime by the flip-dot display, thereby improving the visual information transfer effect.

The embodiments described in this specification may be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

The vehicle state inputter 10, front detector 20, controller 40, illuminator 60, and other devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the control method of an indoor display apparatus of a vehicle. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An indoor display apparatus of a vehicle, comprising:
    a vehicle state inputter configured to receive a vehicle state;
    a front detector configured to detect an object ahead of a vehicle;
    a flip-dot display installed at a top of a cockpit module, and being configured to implement a pixel by rotating a flip disk;
    an illuminator installed around the flip-dot display, and being configured to illuminate a surface of the flip-dot display;
    a controller configured to receive an operation mode of the vehicle from the vehicle state inputter, to receive a distance to the object and a direction of the object from the front detector, and to operate the flip-dot display and the illuminator; and
    an illuminance sensor configured to detect an ambient brightness of the vehicle,
    wherein in response to the object being detected and the distance to the object being within a threshold, the controller is further configured to operate the illuminator according to the ambient brightness, and to operate the flip-dot display to reflect light of the illuminator according to the detected direction and motion of the object.

2. The indoor display apparatus of claim 1, wherein the flip-dot display further comprises a clear cover configured to prevent foreign matters from entering the flip-dot display.

3. The indoor display apparatus of claim 1, wherein a front surface and a rear surface of the flip disk have different colors.

4. The indoor display apparatus of claim 1, wherein a front surface and a rear surface of the flip disk have different reflection characteristics.

5. The indoor display apparatus of claim 1, wherein in response to the operation mode of the vehicle being an autonomous driving mode, the controller is further configured to operate the illuminator in a color according to the autonomous driving mode, and to operate the flip-dot display to reflect the light of the illuminator.

6. The indoor display apparatus of claim 1, wherein in response to the object being detected and the distance to the object being within a threshold, the controller is further configured to operate the flip-dot display according to the detection direction and motion of the object.

7. The indoor display apparatus of claim 1, wherein in response to the distance to the object being within a warning distance, the controller is further configured to operate the flip-dot display while operating the illuminator in a warning color.

8. The indoor display apparatus of claim 1, wherein the controller is further configured to receive the vehicle state, and to operate the flip-dot display to output welcome animation, in response to the vehicle state indicating that the vehicle has started.

9. A control method of an indoor display apparatus of a vehicle, comprising:
    receiving, by a controller, a vehicle state and a result of detecting an object;
    determining, by the controller, whether the object is detected while the vehicle travels, according to the vehicle state and the result of the detection of the object; and
    operating, by the controller, a flip-dot display and an illuminator according to a distance to the object and a direction of the object, in response to the object being detected while the vehicle travels,
    wherein the operating of the flip-dot display and the illuminator comprises receiving, by the controller, ambient brightness from an illuminance sensor, operating the illuminator according to the ambient brightness in response to the distance to the object being within a threshold, and operating the flip-dot display to reflect light of the illuminator according to the detected direction and motion of the object.

10. The control method of claim 9, wherein the flip-dot display comprises a flip disk having a front surface and a rear surface, which have different colors.

11. The control method of claim 9, wherein the flip-dot display comprises a flip disk having a front surface and a rear surface, which have different reflection characteristics.

12. The control method of claim 9, wherein the operating of the flip-dot display and the illuminator comprises operating, by the controller, the flip-dot display according to the detected direction and motion of the object, in response to the distance to the object being within a threshold.

13. The control method of claim 9, wherein the operating of the flip-dot display and the illuminator comprises operating, by the controller, the flip-dot display while operating the illuminator in a warning color, in response to the distance to the object being within a warning distance.

14. The control method of claim 9, further comprising operating, by the controller, the illuminator in a color according to a autonomous driving mode, and operating the flip-dot display to reflect the light of the illuminator, in response to the vehicle state indicating that an operation mode of the vehicle is in the autonomous driving mode.

15. The control method of claim 9, further comprising operating, by the controller, the flip-dot display to output welcome animation, in response to the vehicle state indicating that the vehicle has started.

16. A non-transitory computer-readable storage medium storing instructions that, when executed by a processor, cause the processor to perform a neural network training method of claim 9.

17. The indoor display apparatus of claim 1, wherein the flip-dot display further comprises:
    a plurality of electromagnets;
    and a plurality of flip disks each associated with a respective one of the plurality of electromagnets, and wherein the flip-dot display is further configured to implement the pixel by changing a polarity of a respective one of the plurality of electromagnets to rotate a respective flip-disk of the plurality of flip disks.

18. The indoor display apparatus of claim 1, wherein the flip-dot display is provided at a first viewing angle different than a second viewing angle of a main display of the cockpit module.

* * * * *